US012611915B2

(12) United States Patent
Joardar

(10) Patent No.: US 12,611,915 B2
(45) Date of Patent: Apr. 28, 2026

(54) REFRIGERATION SYSTEM WITH A HEAT SINK

(71) Applicant: Carrier Corporation, Palm Beach Gardens, FL (US)

(72) Inventor: Arindom Joardar, Jamesville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 137 days.

(21) Appl. No.: 18/496,897

(22) Filed: Oct. 29, 2023

(65) Prior Publication Data

US 2024/0140174 A1     May 2, 2024

Related U.S. Application Data

(60) Provisional application No. 63/381,329, filed on Oct. 28, 2022.

(51) Int. Cl.
*B60H 1/32*          (2006.01)
*B60H 1/00*          (2006.01)

(52) U.S. Cl.
CPC ....... *B60H 1/3228* (2019.05); *B60H 1/00885* (2013.01)

(58) Field of Classification Search
CPC ............................. F25B 2600/2511; F25B 5/02
See application file for complete search history.

(56) References Cited

U.S. PATENT DOCUMENTS

| | | | |
|---|---|---|---|
| 3,257,819 A | | 6/1966 | Maloney |
| 6,047,557 A | * | 4/2000 | Pham .................... F04C 27/005 |
| | | | 62/196.3 |
| 6,743,539 B2 | | 6/2004 | Clingerman et al. |
| 6,755,041 B2 | | 6/2004 | Wessells et al. |

(Continued)

FOREIGN PATENT DOCUMENTS

| | | |
|---|---|---|
| DE | 10250355 A1 | 5/2004 |
| DE | 10223949 B4 | 11/2007 |

(Continued)

OTHER PUBLICATIONS

Extended European Search Report received for EP Application No. 23204850.4, mailed on Mar. 1, 2024, 5 Pages.

*Primary Examiner* — Lionel Nouketcha
(74) *Attorney, Agent, or Firm* — Souad Hakim

(57)          ABSTRACT

A refrigeration system is disclosed that includes a heat sink and a refrigeration assembly. The refrigeration assembly includes a compressor configured to compress a refrigerant to form a compressed refrigerant and a condenser installed downstream of the compressor and configured to extract a portion of heat from the received compressed refrigerant to form a condensed refrigerant. The refrigeration assembly also includes a diverting valve installed downstream of the condenser and upstream of the heat sink and to divert a portion of the condensed refrigerant to the heat sink to extract heat therefrom. In addition, the refrigeration assembly includes an expansion valve installed downstream of the diverting valve to reduce the pressure of a portion of the condensed refrigerant. The refrigeration assembly also includes an evaporator installed downstream of the expansion valve and configured to transfer heat to the cooled refrigerant.

19 Claims, 3 Drawing Sheets

(56)  References Cited

U.S. PATENT DOCUMENTS

| | | | |
|---|---|---|---|
| 6,865,901 B2 | 3/2005 | Horn et al. | |
| 6,938,438 B2 | 9/2005 | Lifson et al. | |
| 7,614,245 B2 | 11/2009 | Matsui et al. | |
| 8,347,645 B1 | 1/2013 | Miller | |
| 8,808,937 B2 | 8/2014 | Takemoto et al. | |
| 9,786,935 B2 | 10/2017 | Furusawa et al. | |
| 10,106,012 B2 | 10/2018 | Umehara et al. | |
| 10,714,799 B2 | 7/2020 | Yamamura | |
| 11,203,262 B2 | 12/2021 | Schumacher et al. | |
| 11,335,929 B2 | 5/2022 | Tanoue | |
| 2002/0174673 A1* | 11/2002 | Wilkinson | F24H 15/136 |
| | | | 62/260 |
| 2004/0060312 A1 | 4/2004 | Horn et al. | |
| 2007/0144190 A1* | 6/2007 | Temmyo | F25B 1/10 |
| | | | 62/186 |
| 2019/0056158 A1 | 2/2019 | Horiba et al. | |
| 2021/0252947 A1 | 8/2021 | She et al. | |
| 2021/0339607 A1* | 11/2021 | Kaiser | F25B 49/02 |
| 2021/0394587 A1* | 12/2021 | Senf, Jr. | B60H 1/00271 |
| 2022/0146154 A1* | 5/2022 | Yun | F25D 11/022 |

FOREIGN PATENT DOCUMENTS

| | | | |
|---|---|---|---|
| EP | 2796810 A1 | 10/2014 | |
| EP | 2868998 A2 | 5/2015 | |
| EP | 3742073 B1 | 3/2022 | |
| JP | 2004281110 A | 10/2004 | |

* cited by examiner

REFRIGERATION SYSTEM WITH A HEAT SINK

CROSS REFERENCE TO RELATED APPLICATION

This application claims the benefit of U.S. Provisional Patent Application No. 63/381,329 filed on Oct. 28, 2022, which is incorporated by reference herein in its entirety.

FIELD OF THE INVENTION

This disclosure relates to a fuel cell powered refrigeration system.

BACKGROUND

Mobile refrigeration systems are employed in a large-sized vehicle, such as a truck, to regulate the temperature of an item, such as a food item during its transportation. Such refrigeration systems have a cooling unit which is powered by an onboard power supply. The power supply, in some cases, can be a dedicated engine or prime mover of the vehicle. Another type of power supply is a fuel cell unit that powers the mobile refrigeration system which has a fuel cell stack and associated mechanical components and electronic components that operate the fuel cell stack.

During the operation, the electronic components of the fuel cell unit generate heat which, if not released, can affect the working of the fuel cell unit. For instance, heat from the electronic component, if not removed, can damage the circuits within the electronic component. One of the ways to mitigate this issue is to discharge heat to the ambient air around the vehicle. However, the amount of heat rejection to ambient air depends on various factors, such as temperature and humidity of ambient air, the motion of the vehicle. As a result, the removal of heat may not be optimum during the operation of the fuel cell unit, particularly while operating in high ambient temperatures.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

Disclosed herein is a refrigeration system comprising: a heat sink thermally coupled to a heat generating component; and a refrigeration assembly comprising: a compressor configured to compress a refrigerant to form a compressed refrigerant; a condenser installed downstream of the compressor and configured to extract a portion of heat from the received compressed refrigerant to form a condensed refrigerant; a diverting valve installed downstream of the condenser and upstream of the heat sink, wherein the diverting valve is configured to divert a first portion of the condensed refrigerant to the heat sink and a second portion to a primary expansion valve wherein, the primary expansion valve is installed downstream of the diverting valve and configured to reduce the pressure of the second portion of the condensed refrigerant to form cooled refrigerant; and an evaporator installed downstream of the primary expansion valve.

In one or more embodiments an outlet port of the heat sink is fluidically coupled to an inlet port of the compressor.

In one or more embodiments the refrigeration system further comprises a secondary expansion valve installed downstream of the diverting valve and configured to reduce the pressure of a third portion of condensed refrigerant; and an economizer installed downstream of the secondary expansion valve, and comprising: a first inlet port fluidically coupled to the diverting valve; a first outlet port fluidically coupled to an inlet port of the primary expansion valve; a second inlet port fluidically coupled to an outlet port of the secondary expansion valve; and a second outlet port fluidically coupled to an inlet port of the compressor; wherein the first inlet port and the first outlet port are downstream of the diverting valve and upstream of the primary expansion valve.

In one or more embodiments the diverting valve comprises: an inlet port fluidically coupled to an outlet port of the condenser; a first outlet port fluidically coupled to an inlet port of the heat sink; a second outlet port fluidically coupled to an inlet port of the secondary expansion valve; and a third outlet port fluidically coupled to second inlet port of the economizer.

In one or more embodiments the refrigeration system comprises a flow control valve installed downstream of the first outlet port of the diverting valve and upstream of the inlet port of the heat sink, wherein the first portion of condensed refrigerant has a volume and the flow control valve regulates the volume of the first portion of condensed refrigerant; and a temperature sensor installed at the outlet port of the heat sink to sense a temperature of refrigerant exiting the heat sink, wherein the flow control valve is operated based on the sensed temperature.

In one or more embodiments an outlet port of the heat sink is fluidically coupled to the second outlet port of the economizer.

Also disclosed is a refrigeration system comprising a fuel cell assembly comprising a heat generating component and a heat sink thermally coupled to the heat generating component; and a refrigeration assembly comprising: a compressor configured to compress a refrigerant to form a compressed refrigerant; a condenser installed downstream of the compressor and configured to extract a portion of heat from the received compressed refrigerant to form a condensed refrigerant; a diverting valve installed downstream of the condenser and upstream of the heat sink, wherein the diverting valve is configured to divert a first portion of the condensed refrigerant to the heat sink and a second portion to a primary expansion valve, wherein the primary expansion valve is installed downstream of the diverting valve and configured to reduce the pressure of the second portion of the condensed refrigerant to form cooled refrigerant; and an evaporator installed downstream of the primary expansion valve.

In one or more embodiments an outlet port of the heat sink is fluidically coupled to an inlet port of the compressor.

In one or more embodiments the refrigeration system further comprises a secondary expansion valve installed downstream of the diverting valve and configured to reduce the pressure of a third portion of condensed refrigerant; and an economizer installed downstream of the secondary expansion valve, and comprising: a first inlet port fluidically coupled to the diverting valve; a first outlet port fluidically coupled to an inlet port of the primary expansion valve; a second inlet port fluidically coupled to an outlet port of the secondary expansion valve; and a second outlet port fluidically coupled to an inlet port of the compressor; wherein the first inlet port and the first outlet port are downstream of the diverting valve and upstream of the primary expansion valve.

In one or more embodiments the diverting valve comprises: an inlet port fluidically coupled to an outlet port of the condenser; a first outlet port fluidically coupled to an inlet port of the heat sink; a second outlet port fluidically coupled to an inlet port of the secondary expansion valve; and a third outlet port fluidically coupled to second inlet port of the economizer.

In one or more embodiments the refrigeration system comprises a flow control valve installed downstream of the first outlet port of the diverting valve and upstream of the inlet port of the heat sink, wherein the first portion of condensed refrigerant has a volume and the flow control valve regulates the volume of the first portion of condensed refrigerant; and a temperature sensor installed at the outlet port of the heat sink to sense a temperature of refrigerant exiting the heat sink, wherein the flow control valve is operated based on the sensed temperature.

In one or more embodiments an outlet port of the heat sink is fluidically coupled to the second outlet port of the economizer.

In one or more embodiments the heat generating component is a controller configured to regulate operation of the fuel cell.

Also disclosed is a refrigeration transport unit comprising: a cargo compartment configured to receive and store an item; a fuel cell assembly comprising a heat generating component and a heat sink thermally coupled to the heat generating component; and a refrigeration assembly comprising: a compressor configured to compress a refrigerant to form a compressed refrigerant; a condenser installed downstream of the compressor and configured to extract a portion of heat from the received compressed refrigerant to form a condensed refrigerant; a diverting valve installed downstream of the condenser and upstream of the heat sink, wherein the diverting valve is configured to divert a first portion of the condensed refrigerant to the heat sink and a second portion to a primary expansion valve, wherein the primary expansion valve is installed downstream of the diverting valve and configured to reduce the pressure of the second portion of the condensed refrigerant to form cooled refrigerant; and an evaporator installed downstream of the primary expansion valve.

In one or more embodiments an outlet port of the heat sink is fluidically coupled to an inlet port of the compressor.

In one or more embodiments the refrigeration system further comprises a secondary expansion valve installed downstream of the diverting valve and configured to reduce the pressure of a third portion of condensed refrigerant; and an economizer installed downstream of the secondary expansion valve, and comprising: a first inlet port fluidically coupled to the diverting valve; a first outlet port fluidically coupled to an inlet port of the primary expansion valve; a second inlet port fluidically coupled to an outlet port of the secondary expansion valve; and a second outlet port fluidically coupled to an inlet port of the compressor; wherein the first inlet port and the first outlet port are downstream of the diverting valve and upstream of the primary expansion valve.

In one or more embodiments the diverting valve comprises: an inlet port fluidically coupled to an outlet port of the condenser; a first outlet port fluidically coupled to an inlet port of the heat sink; a second outlet port fluidically coupled to an inlet port of the secondary expansion valve; and a third outlet port fluidically coupled to second inlet port of the economizer.

In one or more embodiments the refrigeration system comprises a flow control valve installed downstream of the first outlet port of the diverting valve and upstream of the inlet port of the heat sink, wherein the first portion of condensed refrigerant has a volume and the flow control valve regulates the volume of the first portion of condensed refrigerant; and a temperature sensor installed at the outlet port of the heat sink to sense a temperature of refrigerant exiting the heat sink, wherein the flow control valve is operated based on the sensed temperature.

In one or more embodiments an outlet port of the heat sink is fluidically coupled to the second outlet port of the economizer.

In one or more embodiments the heat generating component is a controller configured to regulate operation of the fuel cell.

BRIEF DESCRIPTION OF THE DRAWINGS

These and other features, aspects, and advantages of the invention will become better understood when the following detailed description is read with reference to the accompanying drawings in which like characters represent like parts throughout the drawings, wherein.

Figure 1:
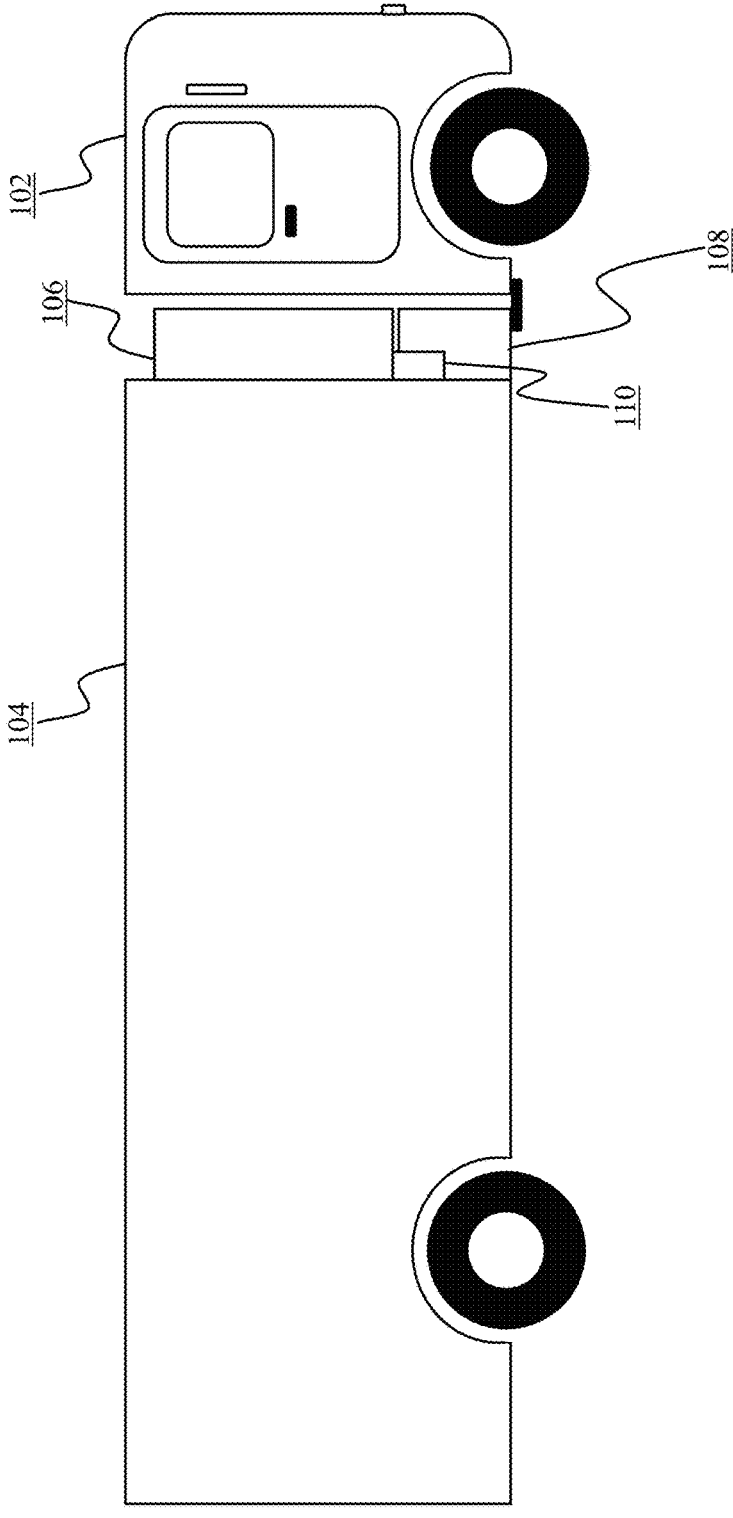
FIG. 1 illustrates a refrigeration transport unit having a fuel cell powered refrigeration system.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which invention belongs. The system and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching, and illuminating some embodiments and their specific features and elements and therefore, should not be construed to limit, restrict or reduce the spirit and scope of this disclosure in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more elements is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements of this disclosure. Some embodiments have been described for the purpose of explaining one or more of the potential ways in which the specific features and/or elements of the proposed disclosure fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the proposed disclosure.

Embodiments of the invention will be described below in detail with reference to the accompanying drawings.

For the sake of clarity, the first digit of a reference numeral of each component of this disclosure is indicative of the Figure number, in which the corresponding component is shown. For example, reference numerals starting with digit "1" are shown at least in FIG. 1. Similarly, reference numerals starting with digit "2" are shown at least in FIG. 2.

FIG. 1 illustrates a refrigeration transport unit 100 to transport perishable cargo, such as food items or cargo that requires cold storage, such as biological samples. Refrigeration transport units include refrigerated trailers, refrigerated trucks, and refrigerated containers. The refrigeration transport unit 100 may be moved by a truck 102 and the refrigeration transport unit 100 includes a cargo compartment 104 configured to receive and store the perishable items, such as a food item. The refrigeration transport unit 100 includes a refrigeration system 106 and a fuel cell assembly 108. The refrigeration system 106 maintains climatic conditions within the cargo compartment 104 within a set of parameters. For instance, the refrigeration system 106 maintains the temperature and humidity inside the cargo compartment 104 to store the food items. The refrigeration system 106 can either be a single-stage vapor-compression refrigeration system or a cascade-type vapor-compression refrigeration system. Further, the refrigeration system 106 can be based on the temperature to be maintained and/or cooling capacity needed in the cargo compartment 104.

Powering the refrigeration system 106 is the fuel cell assembly 108. The fuel cell assembly 108, in one example, may be located in the cargo compartment 104 and in another example, the fuel cell assembly 108 may be integrated into the refrigeration system 106. Although not shown, the fuel cell assembly 108 may include a fuel cell stack, a cylinder or other container for holding fuel, equipment to supply fuel from the cylinder to the fuel cell unit, and electronic components that control the operation of the fuel cell assembly 108. The fuel supply may be located apart from the fuel cell stack. The fuel cell assembly 108, when in operation, provides electrical power to the refrigeration system 106. The fuel cell assembly 108 is designed to power the refrigeration system 106 independently from the operation of the truck 102. Further, the fuel cell assembly 108 during the operation may generate heat, for instance, by the electronic components operating to regulate the operation of the fuel cell assembly 108. This heat, if not discharged, may damage the electronic components.

In order to remove the heat, the fuel cell assembly 108 may include a heat sink 110 that is thermally coupled to one or more heat-generating components of the fuel cell assembly 108. For instance, the heat sink 110 is thermally coupled to the heat-generating electronic components, such that the heat generated by the electronic component can be removed through the heat sink 110. Further, the heat sink 110 is thermally coupled to the refrigeration system 106, such that the heat sink 110 may discharge the heat from the electronic component to the refrigeration system 106 thereby removing the heat from the electronic components. Unlike conventional means that rely on the ambient air to discharge the heat, the heat sink 110 is not dependent on the ambient air to directly discharge the heat. As a result, the discharge of heat from the heat sink 110 is quicker and the amount of heat discharge can be regulated. In one example, the heat sink 110 may receive the heat from an electronic component and may discharge the heat to the refrigerant of the refrigeration system 106. Further, the received heat may then be discharged to the environment via a heat exchanger of the refrigeration system. Discharging the heat to the refrigeration system 106 and using the setup of the refrigeration system 106 to discharge the heat to the environment does away with the need for a separate heat exchanger which is currently used in fuel cell systems. Coupling of the heat sink 110 to the refrigeration system 106 is explained later.

While FIG. 1 indicates a single heat sink 110 which removes the heat from the heat generating components, multiple heat sinks 110 can be employed for a heat generating component of the fuel cell assembly 108. Additionally, there may be multiple heat generating components. When there are multiple heat generating components the multiple heat generating components may share a heat sink, have individual heat sinks or a combination thereof.

Figure 2:
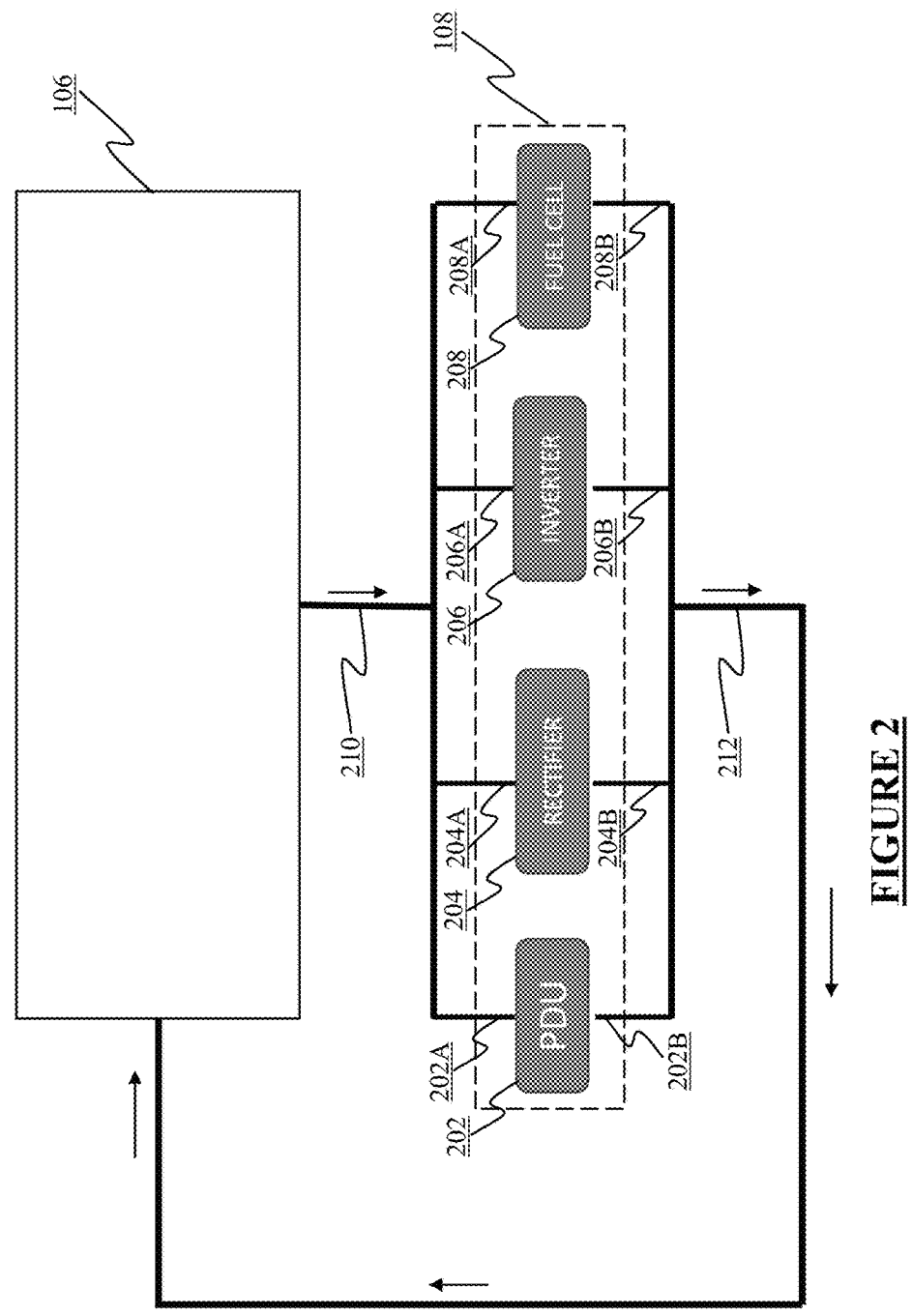
FIG. 2 illustrates a refrigeration system comprising a fuel cell assembly and a refrigeration system.

FIG. 2 illustrates a refrigeration system 200 having a fuel cell assembly 108 and a refrigeration system 106. As mentioned before, the fuel cell assembly 108 may include various internal and external heat generating power-electronics components, such as a power delivery unit (PDU) 202, a rectifier 204, an inverter 206, and a fuel cell 208 that may generate heat during their operation. Further, each of these components may have a heat sink similar to the heat sink 110 shown in FIG. 1. Furthermore, the heat sink in each of these components is fluidically coupled to the refrigeration system 106, such that the heat sinks may receive a portion of a sub-cooled refrigerant from the refrigeration system 106 via an outlet line 210. Further, each of the heat generating components may have inlet lines 202A, 204A, 206A, and 208A which fluidically connect to the outlet line 210.

Each of the heat sinks may also include an outlet line 202B, 204B, 206B, and 208B that enables egress of the refrigerant from the heat sinks. Further, the outlet lines 202B, 204B, 206B, and 208B may be coupled with an inlet hose 212 of the refrigeration system 106 to return the refrigerant in vapour form. In the illustrated embodiment, each heat sink may have a regulator that can vary the volume of the sub-cooled refrigerant fed to the heat sink based on the amount of heat to be removed from the heat generating components 202, 204, 206, and 208. Details of such a configuration are explained in detail with respect to FIG. 3.

Figure 3:
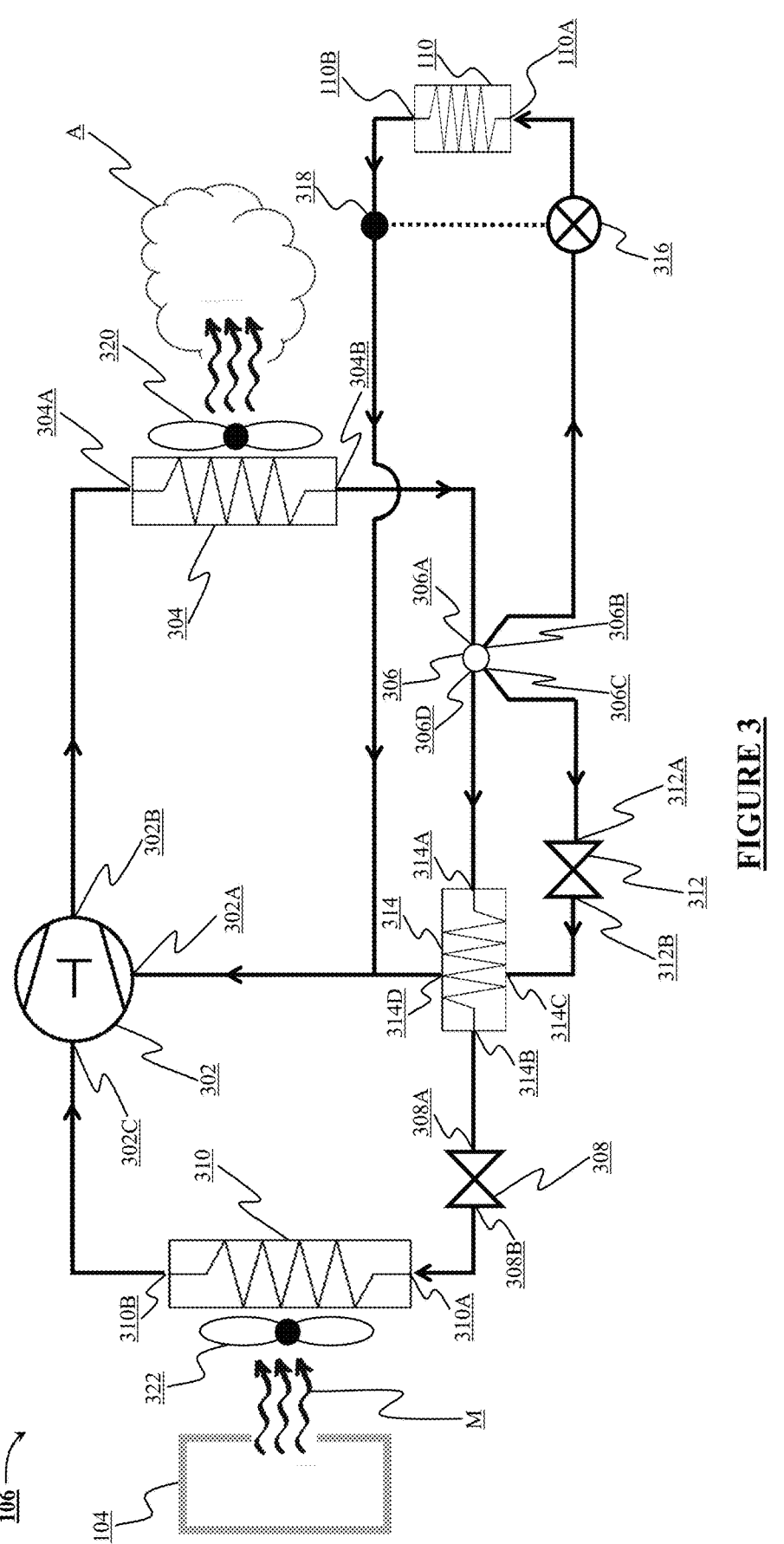
FIG. 3 illustrates the refrigeration system with a heat sink.

FIG. 3 illustrates the refrigeration system 106 along with the heat sink 110. Although the foregoing embodiment illustrated the heat sink 110 being a part of the fuel cell assembly 108, the heat sink 110 can be an integral part of the refrigeration system 106. For instance, the heat sink 110 can be coupled to a controller of either the fuel cell assembly 108. Alternatively, the heat sink 110 can be coupled to a heat generating component of the refrigeration system 106. The heat generating component can be, but is not limited to, a controller, an electric motor operating a compressor or an exhaust fan of the refrigeration system 106, among other examples. In the illustrated embodiment, the refrigeration system 106 includes a refrigeration assembly that may include, but is not limited to, a compressor 302, a condenser 304, a diverting valve 306, an expansion valve 308, an evaporator 310, a secondary expansion valve 312, an economizer 314, a flow control valve 316, and a temperature sensor 318.

In one example, the compressor 302 can either be a reciprocating type, scroll type or rotary type compressor configured to compress the refrigerant to form a compressor refrigerant. Further, as shown in FIG. 3, the condenser 304 is installed downstream of the compressor 302, such that an outlet port 302B of the compressor 302 is fluidically coupled to an inlet port 304A of the condenser 304 via refrigerant lines. The condenser 304 is a heat exchanger that discharges the heat of the compressed refrigerant to ambient air A. Further, to facilitate the discharge of the heat to the ambient air A, the condenser 304 may include a fan 320 that maintains a defined volume of airflow through the condenser 304.

Downstream of the condenser 304 is the diverting valve 306, such that an outlet port 304B of the condenser 304 is fluidically coupled to an inlet port 306A of the diverting valve 306. The diverting valve 306 is configured to divert different portions of the condensed refrigerant to the heat sink 110, the secondary expansion valve 312, and the economizer 314. Accordingly, the diverting valve 306 may include a first outlet port 306B that is fluidically coupled to an inlet port 110A of the heat sink 110 via the flow control valve 316. Specifically, the flow control valve 316 is downstream of the first outlet port 306B and upstream of the inlet port 110A of the heat sink 110, such that a first portion of condensed refrigerant flows through the flow control valve 316. The diverting valve 306 may include a second outlet port 306C to divert a second portion of the condensed refrigerant to an inlet port 312A of the secondary expansion valve 312. In addition, the diverting valve 306 has a third outlet port 306D that is fluidically coupled to the economizer 314.

In one example, the economizer 314 is a heat exchanger that may be employed to extract some of the heat from the portion of the condensed refrigerant flowing to the expansion valve 308 so that a relatively colder condensed refrigerant is fed to the expansion valve 308. A relatively colder condensed refrigerant allows a greater drop in the temperature of the condensed refrigerant by the expansion valve 308 thereby increasing the performance of the refrigeration system 106. The economizer 314 may include a first inlet port 314A that is fluidically coupled to the third outlet port 306D of the diverting valve 306. In addition, the economizer 314 includes a first outlet port 314B which is fluidically coupled to an inlet port 308A of the expansion valve 308. Further, the first inlet port 314A and the first outlet port 314B are downstream of the diverting valve 306 and upstream of the expansion valve 308. On the other hand, the economizer 314 includes a second inlet port 314C that is fluidically coupled to an outlet port 312B of the secondary expansion valve 312. In addition, the economizer 314 includes a second outlet port 314D fluidically coupled to a first inlet port 302A of the compressor 302.

In one example, an outlet port 308B of the expansion valve 308 is fluidically coupled to an inlet port 310A of the evaporator 310. Further, an outlet port 310B of the evaporator 310 is fluidically coupled to a second inlet port 302C of the compressor 302. The evaporator 310 may also include a fan 322 to blow a medium M, such as the air inside the cargo compartment 104 to remove the heat therefrom.

The heat sink 110 is configured to discharge the heat from a heat generating component to the portion of condensed refrigerant flowing through the heat sink 110. Further, an outlet port 110B of the heat sink 110 is fluidically coupled to the first inlet port 302A of the compressor 302, such that the refrigerant exiting the heat sink 110 returns to the compressor 302 for compression. In addition, the outlet port 110B of the heat sink 110 is fluidically coupled to the second outlet port 314D of the economizer 314, such that the stream of the refrigerant exiting through the second outlet port 314D mixes with the stream of refrigerant exiting from the outlet port 110B and a single stream is fed to the first inlet port 302A of the compressor 302.

In order to regulate the flow of the condensed refrigerant into the heat sink 110, a temperature sensor 318 is installed at the outlet port 110B of the heat sink 110. The temperature sensor 318 is configured to sense the temperature of the refrigerant exiting the heat sink 110 and the sensed temperature is indicative of the amount of heat received by the heat sink 110 or in other words, the amount of heat removed from the heat generating component by the heat sink 110. Based on the temperature sensed by the temperature sensor 318, a controller (not shown) may operate the flow control valve 316 to regulate the volume of condensed refrigerant to the heat sink 110. Although not shown, the refrigeration system 106 may also include other temperature/pressure sensors installed at the aforementioned inlet ports and outlet ports to sense the temperature/pressure of the refrigerant in order to regulate the operation of the refrigeration system 106.

Operation of the refrigeration system 106 is now explained. Initially, the compressor 302 is powered so that the compressor 302 compresses the refrigerant to form a compressed refrigerant to high pressure and a high temperature superheated vapor. Further, the high pressure, high temperature compressed refrigerant exits the outlet port 302B and enters the condenser 304 via the inlet port 304A. The condenser 304 discharges the heat from the compressed refrigerant to the ambient air A to form the condensed subcooled liquid refrigerant. The condensed refrigerant is now a low temperature high pressure liquid refrigerant and exits the outlet port 304B and flows to the diverting valves via the inlet port 306A. Further, discharging the heat of the compressed refrigerant to form the condensed refrigerant increases the heat absorbing capacity of the condensed refrigerant.

The diverting valve 306 divides the received condensed refrigerant into different portions and sends different portions to different components of the refrigeration system 106. In one example, the diverting valve 306 diverts a portion of the condensed refrigerant to the heat sink 110. Simultaneously, the heat generating component coupled to the heat sink 110 discharges the heat thereto. The portion of the condensed refrigerant entering the heat sink 110 absorbs the heat therefrom and exits the heat sink 110 via the outlet port 110B. The condensed refrigerant exiting the heat sink 110 is termed heated refrigerant. The heat transfer within the heat sink 110 may be single-phase wherein the liquid temperature increases or may be two-phase convective boiling depending on the heat load from the power-electronics components. In the case of flow boiling, the temperature sensor 318 will sense the degree the superheat of the exiting vapor. Further, the temperature sensors 318 measures the temperature of the heated refrigerant and based on the sensed temperature, the flow control valve 316 may be operated to vary the volume of condensed refrigerant and consequently, heat removed from the heat sink 110.

The diverting valve 306 directs another portion of the condensed refrigerant to the secondary expansion valve 312. The secondary expansion valve 312 reduces the pressure of the received portion of the condensed refrigerant thereby reducing its saturation temperature. The refrigerant is then passed from the outlet port 312B to the second inlet port 314C. Simultaneously, the diverting valve 306 diverts the remaining condensed refrigerant through the third outlet port 306D to economizer 314 via the first inlet port 314A. Inside the economizer 314, the cooled refrigerant entering via the second inlet port 314C extracts a portion of heat from the condensed refrigerant entering the first inlet port 314A. Absorption of the heat from the condensed refrigerant reduces the liquid temperature further prior to its entry in the expansion valve 308 via the inlet port 308A. The refrigerant entering through the second inlet port 314C exits via the second outlet port 314D and mixes with the heated refrigerant from the heat sink 110 before entering the compressor 302 through the first inlet port 302A.

The cooled refrigerant exits the first outlet port 314B and enters the expansion valve 308 via the inlet port 308A. The expansion valve 308 reduces the pressure of the condensed refrigerant thereby cooling the refrigerant. In one example, the condensed refrigerant may liquify while getting cooled. The liquified cooled refrigerant then exits the expansion valve through the outlet port 308B and enters the evaporator 310 through its inlet port 310A. Inside the evaporator 310, the cooled refrigerant receives the heat from the medium M thereby cooling the medium M. The medium M is typically air from the cargo compartment 104. Simultaneously, the cooled refrigerant is heated and exits the evaporator through its outlet port 310B and flows back into the compressor 302 via the second inlet port 302C of the compressor 302. The aforementioned process repeats to cool the cargo compartment 104 and remove the heat from the heat sink 110.

In the case of multiple heat sinks 110 for each heat generating component 202, 204, 206, and 208 (shown in FIG. 2), the first outlet port 306B may be connected to the outlet line 210 (shown in FIG. 2) which supplies the condensed refrigerant to multiple inlet lines 202A, 204A, 206A, and 208A (shown in FIG. 2) parallelly. Further, each of the connected lines may have a separate flow control valve 316 to regulate the volume of a portion of the condensed refrigerant and a temperature sensor 318 to regulate their respective flow control valve 316. Similarly, the inlet hose 212 (shown in FIG. 2) may be connected to the first inlet port 302A to return the heated refrigerant to the compressor 302.

Supplying the condensed refrigerant to the heat sink 110 to remove the heat from the fuel cell assembly 108 enables better performance of the fuel cell assembly 108 and consequently the refrigeration system 106. Moreover, discharging the heat to the refrigerant removes the need for a separate heat exchanger to discharge the heat from the fuel cell assembly directly to ambient air. Moreover, the refrigerant having greater heat absorbing capacity than ambient air enables greater removal of heat from the heat sink 110 thereby enabling greater and better heat removal. In addition, the removal of the heat from the refrigerant also enables the use of the refrigeration system 106 and the fuel cell assembly 108 in high-temperature region.

While specific language has been used, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A refrigeration system comprising:
    a heat sink thermally coupled to a heat generating component; and
    a refrigeration assembly comprising:
        a compressor;
        a condenser configured to form a condensed refrigerant;
        a diverting valve configured to divert a first portion of the condensed refrigerant to the heat sink and a second portion of the condensed refrigerant to a primary expansion valve; wherein,

11 the primary expansion valve is configured to reduce the pressure of the second portion of the condensed refrigerant to form cooled refrigerant;

an evaporator; and a secondary expansion valve configured to reduce the pressure of a third portion of condensed refrigerant, wherein the secondary expansion valve is installed downstream of the diverting valve.

2. The refrigeration system of claim 1, wherein an outlet port of the heat sink is fluidically coupled to an inlet port of the compressor.

3. The refrigeration system of claim 1, wherein the diverting valve comprises:

an inlet port fluidically coupled to an outlet port of the condenser;

a first outlet port fluidically coupled to an inlet port of the heat sink;

a second outlet port fluidically coupled to an inlet port of the secondary expansion valve; and a third outlet port fluidically coupled to an inlet port of an economizer.

4. The refrigeration system of claim 3, comprising:

a flow control valve installed downstream of the first outlet port of the diverting valve and upstream of the inlet port of the heat sink, wherein the first portion of condensed refrigerant has a volume and the flow control valve regulates the volume of the first portion of condensed refrigerant; and a temperature sensor installed at the outlet port of the heat sink to sense a temperature of refrigerant exiting the heat sink, wherein the flow control valve is operated based on the sensed temperature.

5. The refrigeration system of claim 1, wherein an outlet port of the heat sink is fluidically coupled to an outlet port of an economizer.

6. The refrigeration system of claim 1, further comprising:

an economizer comprising:

a first inlet port fluidically coupled to the diverting valve;

a first outlet port fluidically coupled to an inlet port of the primary expansion valve;

a second inlet port fluidically coupled to an outlet port of the secondary expansion valve; and a second outlet port fluidically coupled to an inlet port of the compressor;

wherein the first inlet port and the first outlet port are downstream of the diverting valve and upstream of the primary expansion valve.

7. The refrigeration system of claim 6, wherein the economizer is installed downstream of the secondary expansion valve.

8. The refrigeration system of claim 1, wherein the diverting valve is installed downstream of the condenser and upstream of the heat sink.

9. The refrigeration system of claim 1, wherein the primary expansion device is installed downstream of the diverting valve.

10. The refrigeration system of claim 1, wherein the refrigeration system further comprises wherein the evaporator is installed downstream of the primary expansion valve.

11. A refrigeration system comprising:

a heat sink thermally coupled to a heat generating component; and a refrigeration assembly comprising:

a compressor configured to compress a refrigerant to form a compressed refrigerant;

12 a condenser installed downstream of the compressor and configured to extract a portion of heat from the received compressed refrigerant to form a condensed refrigerant;

a diverting valve installed downstream of the condenser and upstream of the heat sink, wherein the diverting valve is configured to divert a first portion of the condensed refrigerant to the heat sink and a second portion to a primary expansion valve, wherein the primary expansion valve is installed downstream of the diverting valve and configured to reduce the pressure of the second portion of the condensed refrigerant to form cooled refrigerant;

an evaporator installed downstream of the primary expansion valve;

a secondary expansion valve installed downstream of the diverting valve and configured to reduce pressure of a third portion of the condensed refrigerant; and an economizer installed downstream of the secondary expansion valve.

12. The refrigeration system of claim 11, wherein an outlet port of the heat sink is fluidically coupled to an inlet port of the compressor.

13. The refrigeration system of claim 11, wherein the economizer comprises:

a first inlet port fluidically coupled to the diverting valve;

a first outlet port fluidically coupled to an inlet port of the primary expansion valve;

a second inlet port fluidically coupled to an outlet port of the secondary expansion valve; and a second outlet port fluidically coupled to an inlet port of the compressor;

wherein the first inlet port and the first outlet port are downstream of the diverting valve and upstream of the primary expansion valve.

14. The refrigeration of claim 13, wherein the diverting valve comprises:

an inlet port fluidically coupled to an outlet port of the condenser;

a first outlet port fluidically coupled to an inlet port of the heat sink;

a second outlet port fluidically coupled to an inlet port of the secondary expansion valve; and a third outlet port fluidically coupled to second inlet port of the economizer.

15. The refrigeration system of claim 14, comprising:

a flow control valve installed downstream of the first outlet port of the diverting valve and upstream of the inlet port of the heat sink, wherein the first portion of condensed refrigerant has a volume and the flow control valve regulates the volume of the first portion of condensed refrigerant; and a temperature sensor installed at the outlet port of the heat sink to sense a temperature of refrigerant exiting the heat sink, wherein the flow control valve is operated based on the sensed temperature.

16. The refrigeration system of claim 13, wherein an outlet port of the heat sink is fluidically coupled to the second outlet port of the economizer.

17. The refrigeration system of claim 11, further comprising a fuel cell assembly comprising the heat generating component.

18. The refrigeration system of claim 17, wherein the heat generating component is a controller configured to regulate operation of the fuel cell.

19. A refrigeration transport unit comprising:

a cargo compartment configured to receive and store an item;

a fuel cell assembly comprising a heat generating component and a heat sink thermally coupled to the heat generating component; and a refrigeration assembly powered by the fuel cell assembly to regulate a temperature of the cargo compartment, and comprising:

a compressor;

a condenser configured to form a condensed refrigerant;

a diverting valve configured to divert a first portion of the condensed refrigerant to the heat sink and a second portion of the condensed refrigerant to a primary expansion valve; wherein, the primary expansion valve is configured to reduce the pressure of the second portion of the condensed refrigerant to form cooled refrigerant;

an evaporator; and a secondary expansion valve configured to reduce the pressure of a third portion of condensed refrigerant, wherein the secondary expansion valve is installed downstream of the diverting valve.

\* \* \* \* \*